United States Patent [19]

Sugiuchi et al.

[11] Patent Number: 4,575,913
[45] Date of Patent: Mar. 18, 1986

[54] METHOD OF JOINING TUBULAR MEMBER AND ANNULAR PARTS

[75] Inventors: Toshiyasu Sugiuchi, Tokyo; Susumu Aoyama, Misato; Toshio Yoshida, Tokyo, all of Japan

[73] Assignee: Riken Corporation, Tokyo, Japan

[21] Appl. No.: 514,474

[22] Filed: Jul. 18, 1983

[30] Foreign Application Priority Data

Jul. 19, 1982 [JP] Japan ............... 57-125330

[51] Int. Cl.⁴ .................................. B23P 11/00
[52] U.S. Cl. .......................... 29/432; 29/523; 74/567; 285/382.4; 403/277
[58] Field of Search ............... 29/523, 6, 525, 432, 29/159.2; 74/567, 568; 403/277, 280; 285/382.4

[56] References Cited

U.S. PATENT DOCUMENTS

| | | | |
|---|---|---|---|
| 2,892,254 | 6/1959 | Garvin | 29/6 X |
| 3,127,672 | 4/1964 | Kretschmer | 29/432 X |
| 3,467,180 | 9/1969 | Pensotti | 29/523 X |
| 3,481,026 | 12/1969 | Lindesmith et al. | 29/523 X |
| 3,534,988 | 10/1970 | Lindsey | 29/523 X |
| 3,851,378 | 12/1974 | Dessert | 29/523 |
| 4,204,312 | 5/1980 | Tooker | 29/523 |
| 4,265,388 | 5/1981 | Takahashi et al. | 29/525 X |
| 4,293,995 | 10/1981 | Jordan | 29/523 X |

FOREIGN PATENT DOCUMENTS 17816 2/1978 Japan ........................ 74/567

*Primary Examiner*—Charlie T. Moon
*Attorney, Agent, or Firm*—Kalish & Gilster

[57] ABSTRACT

A joint structure of a metallic tubular member and metallic annular parts, the annular parts being joined to the outer periphery of the tubular member as in a camshaft. Each of the annular parts has around its inner periphery at least one serrated portion which cuts into the outer periphery of the tubular member when they are joined, the annular part also having a planar portion facing another portion of the tubular member in such a manner that substantially no pressure is exerted on the planar portion of the annular part.

A method of making such structure involves positioning of the tubular member is required in relation to the annular parts, as by use of a split die, and then forcing into the tubular member a pressing member to expand the tubular member so that the serrated portions cut into the outer periphery of the tubular member.

2 Claims, 5 Drawing Figures

METHOD OF JOINING TUBULAR MEMBER AND ANNULAR PARTS

BACKGROUND AND SUMMARY OF THE INVENTION

This invention relates to the structure of a joint between a metallic tubular member and a metallic annular part and a method of joining them, especially a joint structure and a method of joining a tubular member and annular parts which are designed to constitute a hollow machine component such as particularly a hollow cam shaft and a cam or cams thereon.

The use of hollow structures for machine components such as the cam shaft in an internal combustion engine has become common recently because of the strong demand for savings in material and the weight reduction of such components. As a means for achieving this, a technique is known according to which annular parts such as cams are mounted in position on a tubular member prepared in advance, and then the tubular member is expanded to join them.

Japanese Patent Publication No. 21,299/71 discloses a method in which a tubular member (a shaft tube) is passed through heated split cam and journal combinations (each cam having a shaft hole with splines), and then the shaft tube is expanded by a pressing member (die) to joint the annular parts securely to the shaft tube. With this method, however, since splines are formed along the full length of each cam and journal and the shaft tube is expanded after is has been forced into the parts, the shaft tube inevitably stretches axially to cause bending or a nonuniform wall thickness of the tube, so that it is impossible to join the parts (cams and journals) securely and correctly in the specified positions. It is also extremely difficult to fix the cams in their specified positions by making allowance for possible elongation of the shaft tube. This method, therefore, can not be applied to mass produced machine components.

A method has also been made known by Japanese Patent Publication No. 506/81 in which a shaft tube is forced through splined shaft holes of cams and then only the portion of the shaft tube corresponding to the splined section of each cam is expanded outward to obtain a secure joint. This method also has a low reliability, especially in respect of pull-out force, because engagement is provided at only a few places, and it also requires specific tools for splining, etc., and thus has a low productivity.

The present invention has solved these problems. It has for its object the provision of a structure for joining annular parts securely and accurately to a tubular member, and a method of forming such structure.

In order to attain the object of this invention, at least one serrated portion is provided on the inner periophery of each annular part, the serrated portions being designed to cut or bite into the outer periphery of a tubular member to which the annular parts are joined, each of the annular parts also having a planar portion facing other portions of the tubular members (portions that are not cut into), designed so that substantially no pressure is exerted on the planar portions of the annular parts when they are joined to the tubular member, and then said tubular member is deformed plastically and expanded to effect the desired joining of the annular parts and tubular member within specified dimensional tolerances.

An embodiment of this invention will be described below with reference to the accompanying drawings which illustrate the embodiment.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
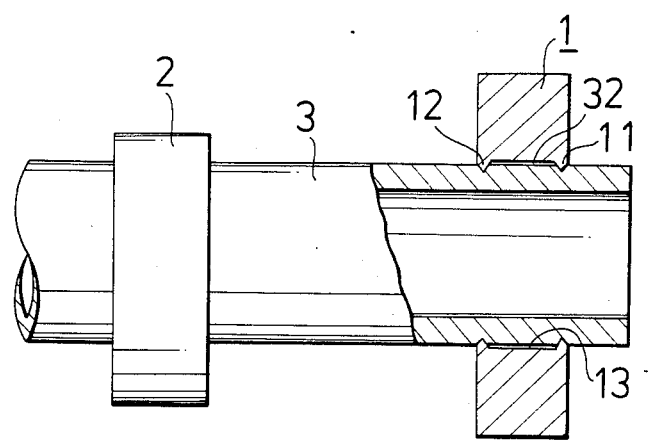
FIG. 1 is a frontal elevation view of a tubular member, such as a cam shaft, having annular parts, such as cams, thereon, being partially sectioned and partially enlarged, to provide a component in accordance with and embodying the invention.
Figure 2:
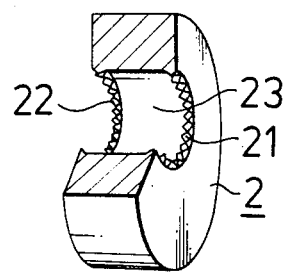
FIGS. 2 and 3 are partially sectioned perspective views of the annular parts of the components of FIG. 1.
Figure 3:
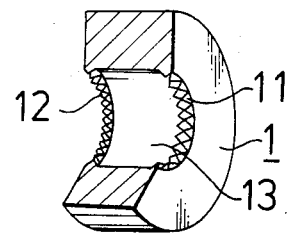

FIG. 1 is a section of the principal parts of a cam shaft comprising a tubular member with annular parts secured thereto. In the drawing, the annular parts, that is, a journal 1 and a cam 2 in the embodiment shown, are disposed and fixed in position with a specific spacing therebetween onto the outer periphery of a tubular member which is a shaft tube 3 in this embodiment. In the journal 1 and cam 2, as shown in FIGS. 2 and 3, a series of serrated protuberances 11, 12, 21, 22 are formed annularly by machining or other means along both edges of the hollow portions (the inner peripheries) thereof. There are planar portions 13, 23 positioned between these series of protuberances 11, 12, 21, 22 facing the corresponding portions of the outer periphery 32 of the shaft tube 3. These protuberances 11, 12, 21, 22 cut perfectly into the shaft tube 3 in such a manner that substantially no pressure is applied to these planar portions of the annular parts when they are joined to the tubular member.

Figure 4:
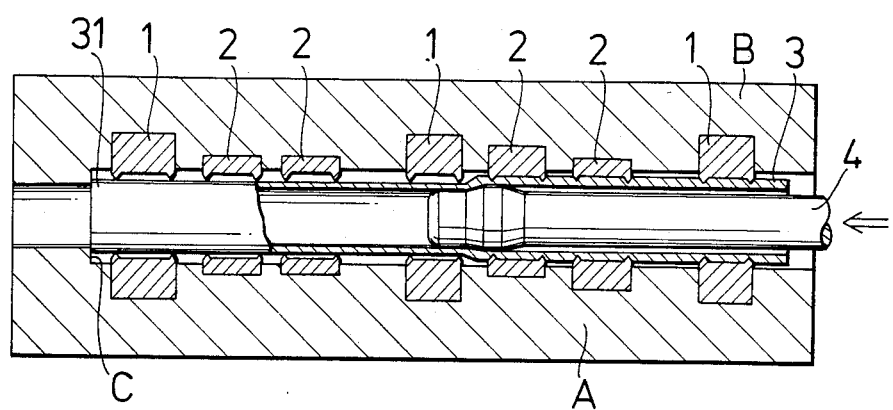
FIG. 4 is a cross sectional view showing the joining process of the present invention.
Figure 5:
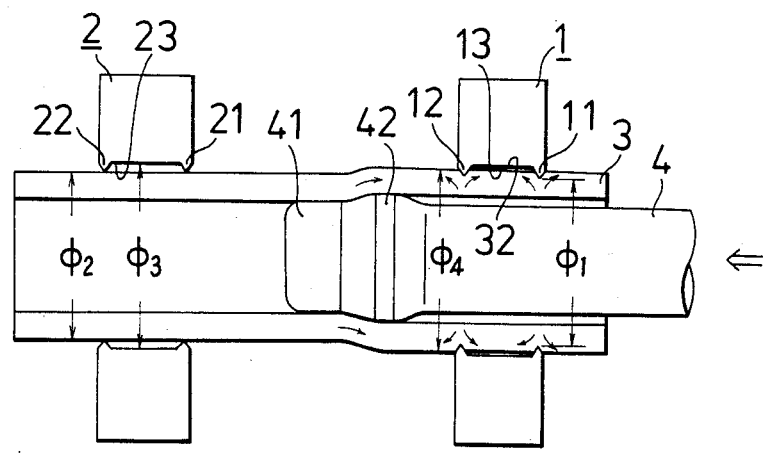
FIG. 5 is a schematic illustration of conditions obtaining during the joining process.

The conditions of joining the journal 1 and cam 2 will now be described more concretely with reference to FIGS. 4 and 5. First, the required number of journals 1 and cams 2 are arranged at suitable spacings from each other and are held in position between a lower die A and an upper die B of a split die, and then a shaft tube 3 is passed through the hollow portions in each of the journals and cams so that the foremost end 31 of the shaft tube 1 butts against and is supported by an end face C. An important design feature of this invention is the construction of the journals 1 and cams 2 so that the inner diameter $\phi_1$ of the serrated portions (the distance from end of one protuberance to the end of the diametrically opposite protuberance) is substantially equal to or greater than the outer diameter $\phi_2$ of the shaft tube 3 while the inner diameter $\phi_3$ of the planar portions 13, 23 between the serrated portions 11 and 12, and 21 and 22 is slightly greater than the proposed outer diameter $\phi_4$ of the expanded tube which can be determined during the design stage. With the annular parts thus positioned under normal temperature conditions, a pressing member (punch) 4 having a probe portion 41 and an enlarged portion (tube-expanding portion) 42 is forced into the shaft tube 3 in the direction indicated in the drawings. This deforms the shaft tube 3 plastically and expands it outward, making the serrated protuberances 11, 12, 21, 22 to cut into said shaft tube 3. Thus the annular parts are secured to the shaft tube 3 by the shearing force and clamping force provided thereto. The outer diameter $\phi_2$ and the dimensions of the serrated portions 11, 12, 21, 22 and the planar portions 13, 23 are set as appropriate in advance so that no deforming pressure is exerted on the planar portions 13, 23, so that although the plastically deformed material fills the spaces in the planar portions 13, 23, plastic deformation of the tubular member is checked by nothing but the serrated ridges 11, 12, 21, 22, so that the shaft tube 3 remains substantially free of any action that would cause unevenness in the wall thickness, bending or axial elongation.

According to the results from test pieces, when four journals made of NiCrMo steel were arranged equidistantly from each other on a shaft tube of at least 100 mm made of an ordinary structural steel (SS 41), they could be joined securely to the shaft tube with the same accuracy as when the annular parts were first arranged in a split die with their outer peripheries clamped, even though the serrated protuberances on the arranged annular parts were positioned offset by a substantial amount (about 0.2 mm) from the theoretical center relative to the outer periphery which served as a positional reference. The axial displacement between the annular parts was as small as only about 0.01 mm in the longest section, and the total elongation of the shaft tube was limited to only about 0.01 mm. Thus, annular parts could be securely joined to a shaft tube with a high accuracy with no bending or unevenness of wall thickness, and it was confirmed that they could well withstand practical usage.

In the above embodiment, the serrated protuberances were provided around the full circumference of both ends of the inner periphery of each annular part, but they could be provided at only one end of the inner periphery, or at the center, or near the center of the inner periphery, or at two or more such places. Provision of at least one array of serrated protuberances is the minimum requirement. Also, while in the above embodiment the engagement protuberances are formed as a series of fine, continuous serrated prongs, they may be replaced with knurls or other forms of protuberance which can readily cut into the tubular member to provide a secure joint between the tubular member and the annular part. It is desirable that the protuberances have a hardness at least equal to that of the tubular member. The punch may not necessarily be of a press-in type; it may be of a type in which a ball is pulled out. Such a type is also capable of making a straight drive operation and can well obtain the object of this invention.

In the above embodiment, the adaption of the invention to a cam shaft has been discussed, but the invention can be applied just as well to gear wheels or other machine parts if such parts are annular in form and are designed to be joined to a tubular member.

According to this invention, as described above, a tubular member (shaft tube) is plastically deformed while being pressed by serrated portions of an annular part when the tube is expanded, but no pressure acts on a planar portion of the annular part, so that well-balanced plastic deformation is performed and the annular part provides almost no influence of unevenness of wall thickness, bending or elongation of the tubular member. Also, since the outer periphery of the tubular member is only clamped by the serrated portions, no high pressure is required for the pressing member. Further, since the annular parts are all joined at normal temperatures, the products are free of any effects of heat and hence no temperature control is required. Thus the desired joint can be accomplished rationally, easily, and accurately.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A method of joining metallic annular parts to the outer periphery of a separately made metallic tubular member which comprises passing the tubular member through the annular parts each of which has two spaced annular serrated engagement portions around its inner periphery, positioning said tubular member as required in relation to said annular parts, and then expanding said tubular member internally by forcing thereinto a pressing member having a diameter larger than the inner diameter of said tubular member in such a manner that substantially no pressure is exerted on a cylindrical surface between two spaced annular serrated portions on the inner periphery of each of said annular parts while imparting a shearing force and a clamping force to the outer wall of said tubular member to obtain a plastically deformed joint between said tubular member and said annular parts.

2. The method according to Claim 1 wherein the expansion of the tubular member is performed by clamping the outer periphery of each annular part.

* * * * *